United States Patent
Morita et al.

(10) Patent No.: US 11,380,466 B2
(45) Date of Patent: Jul. 5, 2022

(54) FERRITE SINTERED MAGNET

(71) Applicant: TDK Corporation, Tokyo (JP)

(72) Inventors: Hiroyuki Morita, Tokyo (JP);
Masanori Ikeda, Tokyo (JP);
Yoshitaka Murakawa, Tokyo (JP);
Hiroyuki Ono, Tokyo (JP); Taku Murase, Tokyo (JP)

(73) Assignee: TDK Corporation, Tokyo (JP)

( * ) Notice: Subject to any disclaimer, the term of this patent is extended or adjusted under 35 U.S.C. 154(b) by 731 days.

(21) Appl. No.: 16/295,156

(22) Filed: Mar. 7, 2019

(65) Prior Publication Data
US 2019/0304643 A1 Oct. 3, 2019

(30) Foreign Application Priority Data

Mar. 28, 2018 (JP) .............................. JP2018-062771
Mar. 28, 2018 (JP) .............................. JP2018-062775

(51) Int. Cl.
| | |
|---|---|
| *H01F 1/11* | (2006.01) |
| *H01F 1/03* | (2006.01) |
| *H01F 1/053* | (2006.01) |
| *C04B 35/26* | (2006.01) |
| *H01F 1/10* | (2006.01) |

(52) U.S. Cl.
CPC ............ *H01F 1/11* (2013.01); *C04B 35/2641* (2013.01); *H01F 1/0315* (2013.01); *H01F 1/0536* (2013.01); *H01F 1/10* (2013.01); *C04B 2235/3217* (2013.01); *C04B 2235/3409* (2013.01); *C04B 2235/767* (2013.01); *C04B 2235/85* (2013.01)

(58) Field of Classification Search
CPC ..... H10F 1/10; H10F 1/0315; C04B 35/2641; C04B 2235/3217; C04B 2235/3409; C04B 2235/767; C04B 2235/85
See application file for complete search history.

(56) References Cited

U.S. PATENT DOCUMENTS

| | | | |
|---|---|---|---|
| 9,601,247 B2 * | 3/2017 | Kobayashi | .......... H01F 41/0266 |
| 2007/0194269 A1 | 8/2007 | Kobayashi et al. | |
| 2010/0237273 A1 | 9/2010 | Kobayashi et al. | |
| 2012/0280167 A1 | 11/2012 | Yanagida et al. | |
| 2014/0097378 A1 | 4/2014 | Yanagida et al. | |
| 2017/0207011 A1 | 7/2017 | Morita | |

FOREIGN PATENT DOCUMENTS

| | | |
|---|---|---|
| JP | 2006-104050 A | 4/2006 |
| WO | WO-2011/111756 A1 | 9/2011 |
| WO | WO-2014/021149 A1 | 2/2014 |

* cited by examiner

*Primary Examiner* — C Melissa Koslow (74) *Attorney, Agent, or Firm* — Faegre Drinker Biddle & Reath LLP (57) ABSTRACT

The present invention provides a ferrite sintered magnet comprising (1) main phase grains containing a ferrite having a hexagonal structure, (2) two-grain boundaries formed between two of the main phase grains, and (3) multi-grain boundaries surrounded by three or more of the main phase grains. The above ferrite sintered magnet comprises Ca, R, Sr, Fe and Co, with R being at least one element selected from the group consisting of rare earth elements and Bi, and comprising at least La. The number Nm of the above main phase grains and the number Ng of the above multi-grain boundaries in the cross section including the direction of the easy magnetization axis of the above ferrite sintered magnet satisfy the formula (1A):

$$50\% \leq Nm/(Nm+Ng) \leq 65\% \qquad (1A).$$

8 Claims, 2 Drawing Sheets

FERRITE SINTERED MAGNET

TECHNICAL FIELD

The present invention relates to ferrite sintered magnets.

BACKGROUND

Hexagonal M type (magnetoplumbite type) Sr ferrite and Ba ferrite are known as materials for permanent magnets made of oxides. The ferrite magnets made of these ferrites serve as permanent magnets in the form of ferrite sintered magnets or bond magnets. In recent years, with the miniaturization and performance enhancement of electronic components, ferrite magnets are also being required to be small-sized while having high magnetic properties.

Residual magnetic flux density (Br) and coercive force (HcJ) are generally used as indices of the magnetic properties of permanent magnets, and it is considered that the higher they are, the higher are the magnetic properties. In the past, from a viewpoint of improving the Br and HcJ of permanent magnets, studies have been conducted by changing the ferrite magnet's composition, such as incorporation of a specific element into a ferrite magnet.

For example, Patent Literature 1 describes an oxide magnetic material and a sintered magnet, in which the Br and HcJ can be improved by incorporation of at least La and Co into the M type Ca ferrite.

[Citation List] [Patent Literature 1] Japanese Unexamined Patent Publication No. 2006-104050

SUMMARY

As mentioned above, attempts have been made to change variously the combination of elements to be added to the main composition to obtain both Br and HcJ satisfactorily, but it is still unclear which combination of added elements provides high properties. Moreover, structure designs for ferrite sintered magnets taking into account conditions other than the constituting elements such as the main composition and the added elements have not yet been sufficiently studied.

The present invention is made in consideration of the above circumstances and aims to provide a ferrite sintered magnet having excellent Br and HcJ in good balance.

One aspect of the present invention is to provide a ferrite sintered magnet comprising main phase grains containing a ferrite having an hexagonal structure; two-grain boundaries formed between two of the above main phase grains; and multi-grain boundaries surrounded by three or more of the above main phase grains, wherein the above ferrite sintered magnet comprised Ca, R, Sr, Fe and Co, wherein R is at least one element selected from the group consisting of rare earth elements and Bi, and comprises at least La, and wherein the number Nm of the above main phase grains and the number Ng of the above multi-grain boundaries in a cross section including the direction of the easy magnetization axis of the above ferrite sintered magnet, satisfy the formula (1A):

$$50\% \leq Nm/(Nm+Ng) \leq 65\% \quad (1A).$$

In the above ferrite sintered magnet, with Nm and Ng satisfying the formula (1A), the orientation and the grain size of the main phase grains become uniform and a ferrite sintered magnet having excellent Br and HcJ in good balance can be obtained.

Another aspect of the present invention is to provide a ferrite sintered magnet comprising; main phase grains comprising a ferrite having an hexagonal structure; two-grain boundaries formed between two of the above main phase grains; and multi-grain boundaries surrounded by three or more of the above main phase grains, wherein the ferrite sintered magnet comprises Ca, R, Sr, Fe and Co, wherein R is at least one element selected from the group consisting of rare earth elements and Bi, and comprises at least La, and wherein the total area Am of the above main phase grains and the total area Ag of the above multi-grain boundaries in a cross section including the direction of the easy magnetization axis of the above ferrite sintered magnet satisfy the formula (1B):

$$85\% \leq Am/(Am+Ag) \leq 98\% \quad (1B).$$

In the above ferrite sintered magnet, with Am and Ag satisfying the formula (1B), the orientation and the grain size of the main phase grains to become uniform and a ferrite sintered magnet having excellent Br and HcJ in good balance can be obtained.

It is preferable that the above two ferrite sintered magnets also comprise 0.03 to 0.3 mass % of Al in terms of $Al_2O_3$. Moreover, it is preferable that the above two ferrite sintered magnets also comprise 0.037 to 0.181 mass % of B in terms of $H_3BO_3$. With the incorporation of Al or B into the above ferrite sintered magnets within the above range, the magnetic properties can further improved in good balance.

According to the present invention, ferrite sintered magnets having excellent Br and HcJ in good balance can be provided.

DETAILED DESCRIPTION

The following describes the preferred embodiments of the present invention. However, the present invention is not limited to the following embodiments.

(Ferrite Sintered Magnet)

Figure 1A:
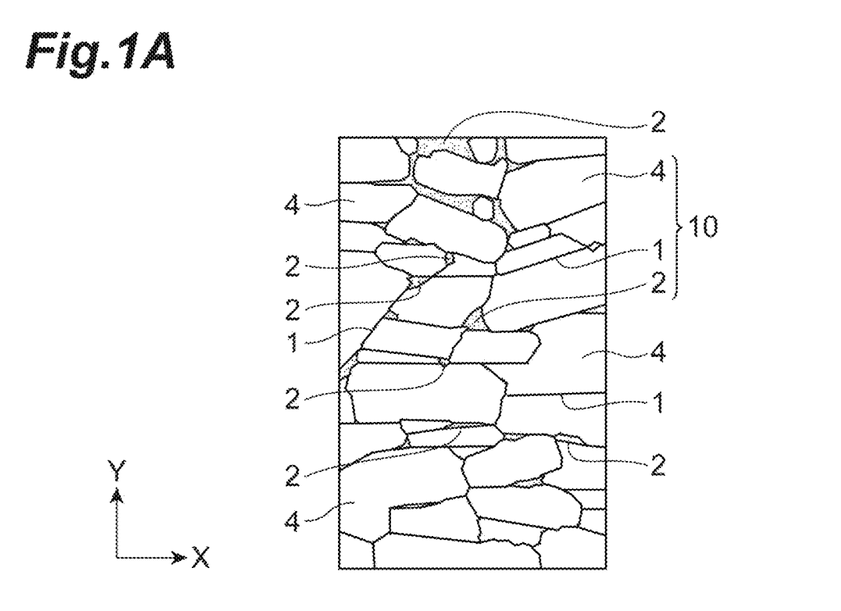
FIGS. 1A to 1B are drawings showing a cross section including the direction of the easy magnetization axis of the ferrite sintered magnet according to one embodiment of the present invention, with FIG. 1A being a schematic diagram of this cross section, and FIG. 1B being a TEM image of the cross section of the ferrite sintered magnet obtained in Example 4 corresponding to the schematic diagram of FIG. 1A.
Figure 1B:
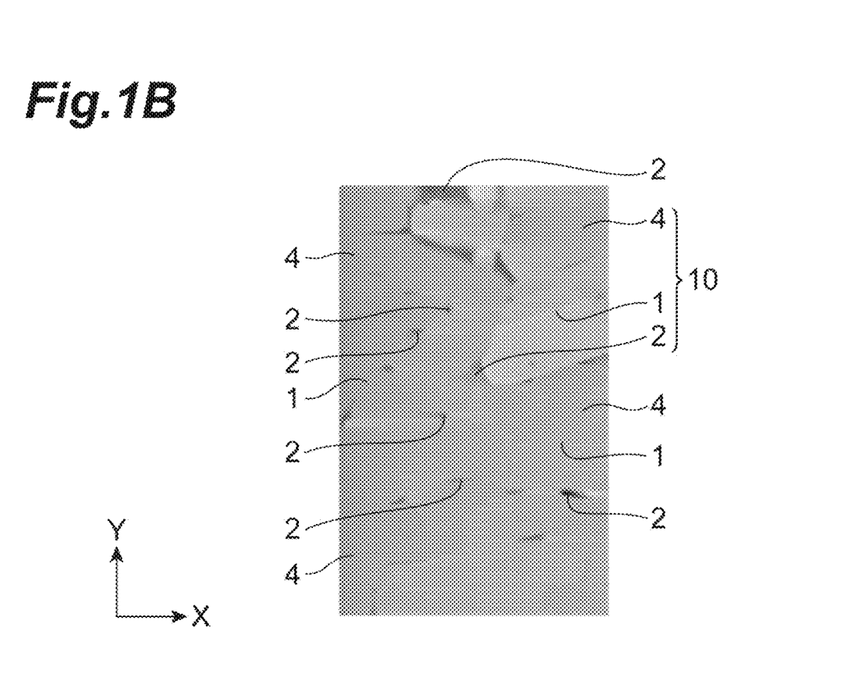

FIGS. 1A and 1B are drawings showing a cross section of the ferrite sintered magnet according to one embodiment of the present invention, with FIG. 1A being a schematic diagram of this cross section and a drawing based on the TEM image shown in FIG. 1B obtained in Example 4 described below. The cross section of the ferrite sintered magnet shown in FIGS. 1A and 1B includes the direction Y of the easy magnetization axis (c axis) and the direction X of the hard magnetization axis perpendicular thereto. In FIGS. 1A and 1B, main phase grains 4 have a plate shape extending (oriented) in the direction X of the hard magnetization axis. In FIGS. 1A and 1B, a ferrite sintered magnet 10 has the main phase grains 4 comprising a ferrite having a hexagonal structure, two-grain boundaries 1 formed between two of the above main phase grains 4, and multi-grain boundaries 2 surrounded by three or more of the above main phase grains 4. It is preferable that the above ferrite having a hexagonal structure be a magnetoplumbite type ferrite (M type ferrite).

In the ferrite sintered magnet 10 according to one embodiment, the number Nm of the main phase grains 4 and the number Ng of the multi-grain boundaries 2 in the cross section including the direction Y of the easy magnetization axis satisfy the formula (1A). The value of Nm/(Nm+Ng) is sometimes referred to below as the main phase number ratio (%). Nm and Ng can be counted, for example, within the range of 4.7 μm×7.6 μm.

$$50\% \leq Nm/(Nm+Ng) \leq 65\% \quad (1A)$$

According to the ferrite sintered magnet according to this embodiment, the balance between Br and HcJ is excellent. The reason is unclear, but can be considered as follows. 50%≤Nm/(Nm+Ng) means that the number of main phase grains is greater than the number of multi-grain boundaries, and is thought to correspond to the main phase grains growing properly, while suppressing excessive grain growth. This is thought to make the orientation and grain size of the main phase grains 4 uniform to enable improvement in the magnetic properties in good balance. In the case of 50%>Nm/(Nm+Ng), it means that the number of main phase grains is smaller than the number of multi-grain boundaries, and is thought to correspond to the orientation and grain size being ununiform. On the other hand, in the case of Nm/(Nm+Ng)>65%, it means that the number of main phase grains is much larger than the number of multi-grain boundaries, and is thought to correspond to an over-promotion of the growth of the main phase grains, since there are too few multi-grain boundaries.

From the same viewpoint, it is preferable for the main phase number ratio to be 51% or more, more preferable to be 52% or more, and further preferable to be 53% or more. From the same viewpoint, it is preferable for the main phase number ratio to be 63% or less, more preferable to be 60% or less, and further preferable to be 58% or less.

In the ferrite sintered magnet 10, in contrast to the above main phase grains 4 which are crystal grains, the above multi-grain boundaries 2 contain a glass phase and is mostly occupied by the glass phase. The glass phase can suppress the contact between the main phase grains 4 in the calcination step and firing step and can suppress the growth of the main phase grains 4. On the other hand, the glass phase becomes a liquid phase in the firing step and can promote the movement of the atoms and the growth of the main phase grains 4. Therefore, in the ferrite sintered magnet 10, the formula (1A) is satisfied and the glass phase is adequately generated, which may control the growth of the main phase grains 4 and equalize the orientation and grain size of the main phase grains 4. Consequently, ferrite sintered magnets having excellent magnetic properties in good balance can be obtained.

Moreover, in the ferrite sintered magnet 10 according to this embodiment, it is preferable that the total area Am of the main phase grains 4 and the total area Ag of the multi-grain boundaries 2 in the cross section including the direction Y of the easy magnetization axis satisfy the formula (2A). The value of Am/(Am+Ag) is sometimes referred to below as the main phase area ratio (%). Am and Ag can be counted, for example, within the range of 4.7 μm×7.6 μm.

$$85\% \leq Am/(Am+Ag) \leq 98\% \quad (2A)$$

The formula (2A) means that the area of the main phase grains is larger by a certain value than the area of the multi-grain boundaries and that multi-grain boundaries exist at a certain ratio or more, and is thought to correspond to the main phase grains growing properly. This is thought to make the orientation and grain size of the main phase grains 4 uniform and to enable improvement in the magnetic properties in good balance. In the case of 85%>Am/(Am+Ag), it means that the area of the main phase grains is not so large, and is thought to correspond to the area of non-magnetic components becoming large. On the other hand, in the case of Am/(Am+Ag)>98%, it shows that the area ratio of the main phase grains is becoming quite high, and is thought to correspond to an over-growth of the main phase grains.

In this embodiment, with a main phase area ratio of 85% or more, the area ratio of non-magnetic components becomes lower to enable improvement in the magnetic properties of the ferrite sintered magnet in good balance. Moreover, in this embodiment, a main phase area ratio of 98% or less adequately promotes the growth of the main phase grains 4 and well-balanced magnetic properties can be obtained more easily.

From the same viewpoint, it is preferable for the main phase area ratio to be 86% or more, more preferable to be 88% or more, and further preferable to be 89% or more. From the same viewpoint, it is preferable for the main phase area ratio to be 97% or less, more preferable to be 96% or less, and further preferable to be 95% or less.

In the ferrite sintered magnet 10 according to another embodiment, the total area Am of the main phase grains 4 and the total area Ag of the multi-grain boundaries 2 in the cross section including the direction Y of the easy magnetization axis satisfy the formula (1B). The value of Am/(Am+Ag) is sometimes referred to below as the main phase area ratio (%). Am and Ag can be counted, for example, within the range of 4.7 μm×7.6 μm:

$$85\% \leq Am/(Am+Ag) \leq 98\% \quad (1B).$$

According to the ferrite sintered magnet according to this embodiment, the balance between Br and HcJ is excellent. The reason is unclear, but can be considered as follows. The formula (1B) means that the area ratio of the main phase grains is higher by a certain value than the area of the multi-grain boundaries and that a certain number or more of multi-grain boundaries exist, and is thought to correspond to the main phase grains growing properly. This is thought to make the orientation and grain size of the main phase grains 4 uniform to enable improvement in the magnetic properties in good balance. In the case of 85%>Am/(Am+Ag), it means that the area of the main phase grains is not that large, and is thought to correspond to the area of non-magnetic components becoming large. On the other hand, in the case of Am/(Am+Ag)>98%, it shows that the area ratio of the main phase grains is becoming quite large, and is thought to correspond to an over-growth of the main phase grains.

In this embodiment, with a main phase area ratio of 85% or more, the area ratio of non-magnetic components becomes lower to enable improvement in the magnetic properties of the ferrite sintered magnet in good balance. Moreover, in this embodiment, a main phase area ratio of 98% or less adequately promotes the growth of the main phase grains 4 and well-balanced magnetic properties can be obtained more easily.

From the same viewpoint, it is preferable for the main phase area ratio to be 86% or more, more preferable to be 88% or more, and further preferable to be 89% or more. From the same viewpoint, it is preferable for the main phase area ratio to be 97% or less, more preferable to be 96% or less, and further preferable to be 95% or less.

In the ferrite sintered magnet 10, in contrast to the above main phase grains 4 which are crystal grains, the above multi-grain boundaries 2 contain a glass phase, with the glass phase occupying the greater part. The glass phase can suppress the contact between the main phase grains 4 in the calcination step and firing step and can suppress the growth of the main phase grains 4. On the other hand, the glass phase becomes a liquid phase in the firing step and can promote the movement of the atoms and the growth of the main phase grains 4. Therefore, in the ferrite sintered magnet 10, the formula (1B) is satisfied and the glass phase is adequately generated, which can control the growth of the main phase grains 4 and equalize the orientation and grain size of the main phase grains 4. Consequently, ferrite sintered magnets having excellent magnetic properties in good balance can be obtained.

Moreover, in the ferrite sintered magnet 10 according to this embodiment, it is preferable that the number Nm of the main phase grains 4 and the number Ng of the multi-grain boundaries 2 in the cross section including the direction Y of the easy magnetization axis satisfy the formula (2B). The value of Nm/(Nm+Ng) is sometimes referred to below as the main phase number ratio (%). Nm and Ng can be counted, for example, within the range of 4.7 μm×7.6 μm.

$$50\% \leq Nm/(Nm+Ng) \leq 65\% \quad (2B)$$

50%≤Nm/(Nm+Ng) means that the number of main phase grains is greater than the number of multi-grain boundaries, and is thought to correspond to the main phase grains growing properly, while suppressing excessive grain growth. This is thought to make the orientation and grain size of the main phase grains 4 uniform to enable improvement in the magnetic properties in good balance. In the case of 50%>Nm/(Nm+Ng), it means that the number of main phase grains is less than the number of multi-grain boundaries, and is thought to correspond to the orientation and grain size being ununiform. On the other hand, in the case of Nm/(Nm+Ng)>65%, it means that the number of main phase grains is quite greater than the number of multi-grain boundaries, and is thought to correspond to an over-promotion of the growth of the main phase grains, since there are too few multi-grain boundaries.

From the same viewpoint, it is preferable for the main phase number ratio to be 51% or more, more preferable to be 52% or more, and further preferable to be 53% or more. From the same viewpoint, it is preferable for the main phase number ratio to be 63% or less, more preferable to be 60% or less, and further preferable to be 58% or less.

The ferrite sintered magnets 10 according to these embodiments are oxides comprising Ca, R, Sr, Fe and Co as metal elements. R is at least one element selected from the group consisting of rare earth elements and Bi and comprises at least La.

It is preferable that the ferrite sintered magnets 10 according to these embodiments contain metal elements with an atom ratio represented by the formula (3).

$$Ca_{1-w-x}R_wSr_xFe_zCo_m \quad (3)$$

In the formula (3), w, x, z and m satisfy the formulas (4) to (7). Ferrite sintered magnets tend to have superior residual magnetic flux density Br and coercive force HcJ by making w, x, z and m satisfy the formulas (4) to (7).

$$0.360 \leq w \leq 0.420 \quad (4)$$

$$0.110 \leq x \leq 0.173 \quad (5)$$

$$8.515 \leq z \leq 9.71 \quad (6)$$

$$0.208 \leq m \leq 0.269 \quad (7)$$

It is preferable that Ca coefficient (1-w-x) in the atom ratio of the metal elements in the ferrite sintered magnets 10 according to these embodiments exceed 0.435 and be less than 0.500. When Ca coefficient (1-w-x) exceeds 0.435, the main phase grains 4 are more easily made M type ferrite. Moreover, it tends not only to be able to decrease the ratio of non-magnetic phases such as α-$Fe_2O_3$, but also to suppress R from being in excess and the formation of different non-magnetic phases such as orthoferrite, and to suppress the decrease in magnetic properties (especially Br or HcJ). From the same viewpoint, it is more preferable that Ca coefficient (1-w-x) be 0.436 or more, and further preferable to exceed 0.445. On the other hand, when Ca coefficient (1-w-x) is less than 0.500, not only the main phase grains 4 are more easily made M type ferrite, but also non-magnetic phases such as $CaFeO_{3-x}$ are reduced and excellent magnetic properties are more easily obtained. From the same viewpoint, it is more preferable that Ca coefficient (1-w-x) be 0.491 or less.

R in the atom ratio of the metal elements in the ferrite sintered magnets according to these embodiments is at least one element selected from the group consisting of rare earth elements and Bi and comprises at least La. Examples of rare earth elements include La, Ce, Pr, Nd, Sm, Eu, Gd, Tb, Dy, Ho, Er, Tm, Yb, Lu and Y. It is preferable that R be La. When R is La, the anisotropy field can be improved.

It is preferable that R coefficient (w) in the atom ratio of the metal elements in the ferrite sintered magnets according to these embodiments be 0.360 or more and 0.420 or less. With R coefficient (w) within the above range, good Br, HcJ and squareness ratio Hk/HcJ tend to be obtained. When R coefficient (w) is 0.360 or more, the amount of Co in solid solution in the ferrite sintered magnet becomes sufficient and the decrease in Br and HcJ is more easily suppressed. From the same viewpoint, it is more preferable that R coefficient (w) exceed 0.370, and further preferable to be 0.380 or more. On the other hand, when R coefficient (w) is 0.420 or less, the formation of different non-magnetic phases such as orthoferrite can be suppressed and the ferrite sintered magnet can be made more practical with a high Hk/HcJ. From the same viewpoint, it is more preferable that R coefficient (w) be less than 0.410.

It is preferable that Sr coefficient (x) in the atom ratio of the metal elements in the ferrite sintered magnets according to these embodiments be 0.110 or more and 0.173 or less. With Sr coefficient (x) within the above range, good Br, HcJ and Hk/HcJ can be obtained. When Sr coefficient (x) is 0.110 or more, the ratio of Ca and/or La becomes smaller and the decrease in HcJ is more easily suppressed. On the other hand, when Sr coefficient (x) is 0.173 or less, sufficient Br and HcJ are more easily obtained. From the same viewpoint, it is more preferable that Sr coefficient (x) be less than 0.170, and further preferable to be less than 0.165.

It is preferable that Fe coefficient (z) in the atom ratio of the metal elements in the ferrite sintered magnets according to these embodiments be 8.51 or more and 9.71 or less. With Fe coefficient (z) within the above range, good Br, HcJ and Hk/HcJ can be obtained. From a viewpoint of obtaining a better HcJ, it is more preferable that Fe coefficient (z) exceed 8.70 and be less than 9.40. Moreover, from a viewpoint of obtaining a better Hk/HcJ, it is more preferable that Fe coefficient (z) exceed 8.90 and be less than 9.20.

It is preferable that Co coefficient (m) in the atom ratio of the metal elements in the ferrite sintered magnets according to these embodiments be 0.208 or more and 0.269 or less. When Co coefficient (m) is 0.208 or more, a superior HcJ can be obtained. From the same viewpoint, it is more preferable that Co coefficient (m) exceed 0.210, further preferable to exceed 0.220, and especially preferable to be 0.250 or more. On the other hand, when Co coefficient (m) is 0.269 or less, a superior Br can be obtained. From the same viewpoint, it is more preferable that Co coefficient (m) be 0.250 or less. Moreover, the incorporation of Co in the ferrite sintered magnets can further improve the anisotropy field.

It is preferable that the ferrite sintered magnets 10 according to these embodiments contain B (boron). It is preferable that the amount of B contained in the ferrite sintered magnets 10 be 0.037 mass % or more and 0.181 mass % or less in terms of $H_3BO_3$. With the incorporation of 0.037 mass % or more of B in the ferrite sintered magnets 10 in terms of $H_3BO_3$, a stable HcJ can be obtained more easily uniform when the calcination temperature has changed, and, since the main phase number ratio and the main phase area ratio improve, to more easily improve Br and HcJ in good balance. From the same viewpoint, it is more preferable that B content be 0.050 mass % or more, and further preferable to be 0.070 mass % or more in terms of $H_3BO_3$. On the other hand, by making the amount of B contained in the ferrite sintered magnets 10 be 0.181 mass % or less in terms of $H_3BO_3$, a high HcJ is more easily maintained. From the same viewpoint, it is more preferable that B content be 0.165 mass % or less, and further preferable to be 0.150 mass % or less in terms of $H_3BO_3$.

It is preferable that the ferrite sintered magnets 10 according to these embodiments also contain Al (aluminum). It is preferable that the amount of Al contained in the ferrite sintered magnets 10 be 0.03 mass % or more and 0.3 mass % or less in terms of $Al_2O_3$. The incorporation of 0.03 mass % or more of Al in the ferrite sintered magnets 10 in terms of $Al_2O_3$ tends to suppress the grain growth during the calcination and to improve the main phase number ratio and the main phase area ratio. Consequently, the Br and HcJ of the obtained ferrite sintered magnets 10 more easily improve in good balance. From the same viewpoint, it is more preferable that Al content be 0.10 mass % or more in terms of $Al_2O_3$. On the other hand, by making the amount of Al contained in the ferrite sintered magnets 10 be 0.3 mass % or less in terms of $Al_2O_3$, excellent Br and HcJ can be obtained.

The ferrite sintered magnets 10 according to these embodiments can also contain Si (silicon). The amount of Si contained in the ferrite sintered magnets 10 can be 0.1 to 3 mass % in terms of $SiO_2$. With the incorporation of Si in the ferrite sintered magnets 10 within the above range, a high HcJ can be more easily obtained. From the same viewpoint, Si content may be 0.5 to 1.0 mass % in terms of $SiO_2$.

The ferrite sintered magnets 10 according to these embodiments may also contain Ba (barium). In case the ferrite sintered magnets 10 contain Ba, the amount of Ba contained in the ferrite sintered magnets can be 0.001 to 1.0 mass % and may be 0.001 to 0.068 mass % in terms of BaO. Even if the ferrite sintered magnets contain Ba within the above range, the HcJ of the ferrite sintered magnets can be maintained at a high value. However, when more than 1.0 mass % of Ba in terms of BaO is contained, the sintering temperature dependency tends to decrease and the coercive force also tends to decrease.

The ferrite sintered magnets 10 according to these embodiments may also contain Cr, Ga, Mg, Cu, Mn, Ni, Zn, In, Li, Ti, Zr, Ge, Sn, V, Nb, Ta, Sb, As, W and Mo. The content of each element is preferably 3 mass % or less, and more preferably 1 mass % or less in terms of oxide. Moreover, from a viewpoint of avoiding a decrease in magnetic properties, the total content of these elements should be 2 mass % or less.

It is preferable that the ferrite sintered magnets 10 according to these embodiments do not contain alkali metal elements (Na, K, Rb, etc.). Alkali metal elements tend to easily decrease the saturation magnetization of the ferrite sintered magnets 10. However, in some cases, alkali metal elements are contained in the raw materials to obtain the ferrite sintered magnets 10, for example, and if it is contained inevitably in this way, they may be contained in the ferrite sintered magnets 10. The content of alkali metal elements that does not significantly impact the magnetic properties is 3 mass % or less.

The composition of the ferrite sintered magnets 10 can be measured by fluorescent X-ray quantitative analysis. Moreover, the presence of main phases can be confirmed by X-ray diffraction or electron beam diffraction.

The average size of the main phase grains 4 in the ferrite sintered magnets 10 according to these embodiments is preferably 1.5 μm or less, more preferably 1.0 μm or less, and further preferably 0.5 to 1.0 μm. With such an average grain size, a high HcJ can be obtained more easily. The average size of the main phase grains 4 of the ferrite sintered magnets 10 can be, for example, the feret diameter (n=10) in the above cross section including the direction of the easy magnetization axis.

(Method for Producing the Ferrite Sintered Magnet)

Below is shown an example of method for producing the ferrite sintered magnets 10 according to these embodiments. The above production method comprises a raw material powder preparation step, a calcination step, a pulverizing step, a molding step and a firing step. Moreover, the above production method may comprise a drying step of fine pulverized slurry and a kneading step between the above pulverizing step and the above molding step, and may comprise a degreasing step between the above molding step and the above firing step. Each step is described below.

<Raw Material Powder Preparation Step>

In the raw material powder preparation step, the raw material powder is obtained by mixing the raw materials for the ferrite sintered magnet to obtain a raw material mixture and pulverizing this as needed. First, examples of raw materials for the ferrite sintered magnet include compounds (raw material compounds) containing one or two or more of the elements constituting it. For example, powders are suitable as a raw material compound. Examples of raw material compounds include oxides of each element, or compounds becoming oxides by firing (carbonates, hydroxides, nitrates, etc.). Examples include $SrCO_3$, $La_2O_3$, $Fe_2O_3$, $BaCO_3$, $CaCO_3$, $Co_3O_4$, $H_3BO_3$, $Al_2O_3$ and $SiO_2$.

Each raw material is, for example, weighed and mixed in order to obtain the desired composition of the ferrite sintered magnet, then mixed and pulverized for about 0.1 to 20 h using a wet attritor, a ball mill or the like. From a viewpoint of having a uniform blend, it is preferable that the average size of the powder of the raw material compound be, for example, about 0.1 to 2.0 μm. The raw material powder comprises at least Ca, R, Sr, Fe, Co and B. Especially, with the incorporation of B in the raw material powder, a stable HcJ can be obtained more easily, even when the calcination temperature has changed, and, the main phase number ratio and the main phase area ratio can be improved, thereby Br and HcJ can be more easily improved in good balance. Moreover, in case the ferrite sintered magnet comprises Al, the raw material powder also comprises Al. This tends to suppress the grain growth during the calcination and to improve the main phase number ratio and the main phase area ratio.

A part of the raw materials can also be added in the pulverizing step described below. However, in this embodiment, it is preferable not to add a part of the raw materials in the pulverizing step. Namely, it is preferable that all the Ca, R, Sr, Fe, Co and B constituting the obtained ferrite sintered magnet (excluding the elements inevitably mixed) be supplied from the raw material powder of the raw material powder preparation step. Especially, it is preferable that all the B constituting the ferrite sintered magnet be supplied from the raw material powder of the raw material powder preparation step. Moreover, it is preferable that all the Al constituting the ferrite sintered magnet be supplied from the raw material powder of the raw material powder preparation step. This enables to further easily obtain the above effect obtained by incorporating B or Al to the raw material powder.

<Calcination Step>

In the calcination step, the raw material powder obtained in the raw material powder preparation step is calcined. It is preferable to conduct the calcination, for example, under an oxidizing atmosphere such as air (the atmosphere). It is preferable that the temperature of the calcination be in the range of 1100 to 1400° C., more preferable to be 1100 to 1300° C., and further preferable to be 1150 to 1300° C. The duration of the calcination (how long it is retained at the temperature of calcination) can be 1 s to 10 h long, and is preferably 1 s to 5 h long. The calcined body obtained by the calcination contains 70% or more of main phase (M phase) described above. The primary particle size of the calcined body is preferably 5 μm or less.

<Pulverizing Step>

In the pulverizing step, the calcined body that became granular or agglomerated in the calcination step is pulverized and made into a powder again. This enables to facilitate the molding in the molding step described below. In this pulverizing step, the raw materials that were not mixed in the raw material powder preparation step may be further added. However, from a viewpoint of improving the main phase number ratio and the main phase area ratio, it is preferable that the raw materials be all mixed in the raw material powder preparation step. For example, the pulverizing step may have two sub steps, where the calcined body is pulverized to become a coarse powder (coarse pulverizing), then further finely pulverized (fine pulverizing).

For example, the coarse pulverizing is conducted using a vibration mill etc. until the average particle size is 0.5 to 5.0 μm. In the fine pulverizing, the coarse pulverized material obtained in the coarse pulverizing is further pulverized by a wet attritor, a ball mill or a jet mill. In the fine pulverizing, the fine pulverizing is conducted so that the average particle size of the obtained fine pulverized material be preferably 0.08 to 2.0 μm, more preferably 0.1 to 1.0 μm, further preferably about 0.1 to 0.5 μm. It is preferable that the specific surface area of the fine pulverized material (for example, found by the BET method) be about 4 to 12 m$^2$/g. The suitable pulverizing time is different depending on the pulverizing method, for example in the case of a wet attritor, it is preferable to be about 30 min to 20 h, and with wet pulverizing by a ball mill, it is preferable to be about 10 to 50 h.

In the fine pulverizing step, in the case of the wet method, water, as well as non-aqueous dispersion media such as toluene and xylene can be used as a dispersion medium. When using a non-aqueous dispersion medium, high orientation tends to be obtained during the wet molding described below. On the other hand, when using an aqueous dispersion medium, it is advantageous from the viewpoint of productivity.

Moreover, in the fine pulverizing step, for example, a polyhydric alcohol represented by the formula $C_n(OH)_nH_{n+2}$ may be added as a dispersant in order to increase the degree of orientation of the sintered body obtained after the firing. Here, as a polyhydric alcohol, it is preferable that n in the formula be 4 to 100, more preferable to be 4 to 30, further preferable to be 4 to 20 and especially preferable to be 4 to 12. Examples of polyhydric alcohols include sorbitol. Moreover, two or more polyhydric alcohols may be used in combination. Furthermore, in addition to polyhydric alcohols, other known dispersant may be used in combination.

If adding a polyhydric alcohol, it is preferable that the amount added be 0.05 to 5.0 mass % to the material to which it is added (for example, the course pulverized material), more preferable to be 0.1 to 3.0 mass %, and further preferable to be 0.2 to 2.0 mass %. The polyhydric alcohol added in the fine pulverizing step is thermally decomposed and removed in the firing step described below.

<Molding Step>

In the molding step, the ground material obtained after the pulverizing step (preferably the fine pulverized material) is molded in a magnetic field to obtain a green compact. The molding can be performed by either a dry molding or a wet molding method. From a viewpoint of increasing the degree of magnetic orientation, it is preferable to perform it by wet molding.

If molding by wet molding, for example, it is preferable that, after obtaining a slurry by performing the fine pulverizing step described above by the wet method, this slurry be concentrated to a predetermined concentration to obtain a slurry for wet molding and perform the molding using this slurry. The concentration of the slurry can be performed by centrifugation, filter press or the like. It is preferable that the fine pulverized material accounts for about 30 to 80 mass % of the total amount of slurry for wet molding. In this case, a surfactant such as gluconic acid, gluconate and sorbitol may be added to the slurry. Moreover, a non-aqueous dispersion medium may be used as a dispersion medium. As a non-aqueous dispersion medium, organic dispersion media such as toluene and xylene can be used. In this case, it is preferable to add a surfactant such as oleic acid. The slurry for wet molding may be prepared by adding a dispersion medium etc. to the fine pulverized material in a dry state after the fine pulverizing.

Next, in the wet molding, molding in magnetic field is performed on this slurry for wet molding. In this case, it is preferable that the molding pressure be about 9.8 to 49 MPa (0.1 to 0.5 ton/cm$^2$), and it is preferable that the applied magnetic field be about 398 to 1194 kA/m (5 to 15 kOe).

<Firing Step>

In the firing step, the green compact obtained in the molding step is fired to obtain a sintered body. This enables to obtain a sintered body of a ferrite magnet as described above, that is, a ferrite sintered magnet. The firing can be performed under an oxidizing atmosphere such as the air atmosphere. It is preferable that the firing temperature be 1050 to 1270° C. and more preferable to be 1080 to 1240° C. Moreover, it is preferable that the firing time be about 0.5 to 3 h.

If obtaining the green compact by wet molding as described above, the volatilization of the dispersion medium etc. may occur intensively and cracks may occur on this green compact if the green compact is rapidly heated in the firing step, without drying it sufficiently. There, from a viewpoint of avoiding such an inconvenience, it is preferable to suppress the occurrence of cracks by sufficiently drying the green compact by heating it at a low temperature rising rate of about 1° C./min, for example, from room temperature to about 100° C., before reaching the above sintering temperature. Moreover, if adding surfactants (dispersant) etc., it is preferable to sufficiently remove these (degreasing treatment) by heating at a temperature rising rate of about 3° C./min, for example, in the temperature range of about 100 to 500° C. These treatments may be performed at the beginning of the firing step, or they may be performed separately before the firing step.

Moreover, it is preferable that the temperature rising rate when heating to the firing temperature be 5° C./min or less, more preferable to be 3° C./min or less, further preferable to be 1° C./min or less and especially preferable to be 0.5° C./min or less. A temperature rising rate within the above range tends to improve the main phase number ratio and the main phase area ratio of the obtained ferrite sintered magnet. On the other hand, it is preferable that the temperature dropping rate when cooling from the firing temperature be 5° C./min or more and more preferable to be 10° C./min or more. With a temperature dropping rate within the above range, ferrite sintered magnets having excellent Br and HcJ in good balance can be obtained more easily.

Through the above steps, the ferrite sintered magnets 10 having the main phase grains 4, the two-grain boundaries 1 located between two of the above main phase grains 4, and the multi-grain boundaries 2 surrounded by three or more of the above main phase grains 4, and wherein the above main phase number ratio is 50% or more are produced.

Through the above steps, the ferrite sintered magnets 10 having the main phase grains 4, the two-grain boundaries 1 located between two of the above main phase grains 4, and the multi-grain boundaries 2 surrounded by three or more of the above main phase grains 4, and wherein the above main phase area ratio is 85% or more are produced.

The above has been a description of a suitable method for producing ferrite sintered magnets, but, as long as the ferrite sintered magnet of the present invention is produced, its production method is not limited to the production method described above, and the conditions etc. can be changed as appropriate.

The shape of the ferrite sintered magnet is not particularly limited. The ferrite sintered magnet may be planar such as a disc, it may be columnar such as a cylinder or a square pole, it may be shaped as a C-shape, a bow, an arch or the like, or it may be ring-shaped.

The ferrite sintered magnet according to this embodiment can be used, for example, in rotating machinery such as motors and generators, as well as in various sensors.

EXAMPLES

The present invention is further explained below in detail with Examples, but the present invention is not limited to the following Examples.

(Preparation of the Ferrite Sintered Magnet)

Example 1

<Raw Material Powder Preparation Step>

Calcium carbonate ($CaCO_3$), lanthanum oxide ($La_2O_3$), strontium carbonate ($SrCO_3$), iron oxide and cobalt oxide ($CO_3O_4$) were prepared as raw materials of the metal elements constituting the ferrite sintered magnet. These raw materials were weighed and mixed so that w=0.39, x=0.14, z=9.1 and m=0.25 in the ferrite sintered magnet containing the metal elements with the atom ratio represented by the formula (3a). Next, boric acid ($H_3BO_3$), silicon oxide ($SiO_2$) and aluminum oxide ($Al_2O_3$) were also prepared as raw materials for the ferrite sintered magnet. Boric acid, silicon oxide and aluminum oxide were each weighed and added to the above mixture so that the content of boron be 0.16 mass % in terms of $H_3BO_3$, the content of silicon be 0.72 mass % in terms of $SiO_2$, and the content of aluminum be 0.05 mass % in terms of $Al_2O_3$ to the entire ferrite sintered magnet that was obtained. The obtained raw material mixture was mixed and pulverized in a wet attritor and then dried to obtain a raw material powder.

$$Ca_{1-w-x}La_wSr_xFe_zCo_m \qquad (3a)$$

<Calcination and Pulverizing Step>

Calcination retained at 1200° C. for 2 h in the atmosphere was performed on the raw material powder to obtain a calcined body. The obtained calcined body was coarsely pulverized in a small rod vibration mil so that the specific surface area found by the BET method be 0.5 to 2.5 $m^2/g$. The obtained coarse pulverized material was finely pulverized for 32 h using a wet ball mill to obtain a slurry for wet molding having finely-pulverized particles with a specific surface area found by the BET method of 7.0 to 10 $m^2/g$. The slurry for wet molding was obtained by dehydrating the slurry after fine pulverizing with a centrifuge and adjusting the solid content concentration to 70 to 80 mass %.

<Molding and Firing Step>

Using a wet magnetic field molding machine equipped with a mold having a cylindrical cavity, pressure was applied to the slurry for wet molding from above and below the cylindrical cavity, and the slurry for wet molding was molded in an applied magnetic field of 10 kOe in the direction parallel to the direction of the pressure (applied magnetic field direction), to obtain a cylindrical green compact of 30 mm diameter×15 mm thickness. The obtained green compact was sufficiently dried in the atmosphere at room temperature. The green compact after drying was heated in the atmosphere at 1.0° C./min and retained at 1205° C. for 1 h, then cooling at 10.0° C./min was performed to obtain the ferrite sintered magnet of Example 1.

Example 2

The ferrite sintered magnet of Example 2 was obtained in the same way as in Example 1, except that the green compact after drying was heated in the atmosphere at 5.0° C./min and retained at 1215° C. for 1 h, then that cooling at 5.0° C./min was performed in the firing step.

Example 3

The ferrite sintered magnet of Example 3 was obtained in the same way as in Example 1, except that the green compact after drying was heated in the atmosphere at 1.0° C./min and retained at 1190° C. for 4 h, then that cooling at 10.0° C./min was performed in the firing step.

Example 4

The ferrite sintered magnet of Example 4 was obtained in the same way as in Example 1, except that the green compact after drying was heated in the atmosphere at 0.5° C./min and retained at 1205° C. for 1 h, then that cooling at 10.0° C./min was performed in the firing step.

Comparative Example 1

The ferrite sintered magnet of Comparative Example 1 was obtained in the same way as in Example 2, except that boric acid and aluminum oxide were not added in the raw material powder preparation step.

(Evaluation Method)

[Main Phase Number Ratio and Main Phase Area Ratio in the Cross Section Including the Direction of the Easy Magnetization Axis]

The upper and lower surfaces of the cylindrical ferrite sintered magnets obtained in the Examples and Comparative Examples were polished. Then, the ferrite sintered magnets were cut at the face including the direction of the easy magnetization axis (applied magnetic field in the molding), and the cross section was observed with a transmission electron microscope (TEM). In the TEM images, ten areas of 4.7 μm×7.6 μm were selected and the number Nm of particulate main phase grains present in each area and the number Ng of multi-grain boundaries were counted to find the main phase number ratio. Even if the main phase grains, etc. were partly contained in the area, it was considered as present in the area. The average value was found from the number ratio in the ten selected areas. The main phase grains, two-grain boundaries and multi-grain boundaries in the TEM images were visually discerned from the color density on the TEM images.

Moreover, in the TEM images, ten areas of 4.7 μm×7.6 μm were selected, the area Am occupied by the main phase grains present in each area and the area Ag occupied by the multi-grain boundaries were found, and the main phase area ratio was calculated. The average value was found from the area ratio in the ten selected areas. The calculation results of the main phase number ratio and the main phase area ratio (both the average values) are shown in Table 1.

[Magnetic Properties]

After processing the upper and lower surfaces of each cylindrical ferrite sintered magnet obtained in the Examples and Comparative Examples, their residual magnetic flux density Br (mT) and their coercive force HcJ (kA/m) were measured using a B-H tracer of a maximum applied magnetic field of 25 kOe. The value of Br+HcJ/10 was calculated from the obtained value of Br and HcJ. Br+HcJ/10 is an index indicating the overall magnetic properties of the ferrite sintered magnet, and a high value of Br+HcJ/10 has been desired in recent years regarding the balance between Br and HcJ. Namely, a high Br+HcJ/10 means that the ferrite sintered magnet has excellent Br and HcJ in good balance. The values for Br, HcJ and Br+HcJ/10 are shown in Table 1.

FIG. 1B is a TEM image showing a cross section including the direction of the easy magnetization axis of the ferrite sintered magnet obtained in Example 4. The black parts in FIG. 1B correspond to the multi-grain boundaries 2 and the other white or gray parts correspond to the main phase grains 4. In FIG. 1B, the ferrite sintered magnet 10 has a plurality of the main phase grains 4, the two-grain boundaries 1 located between two of the main phase grains 4, and the multi-grain boundaries 2 surrounded by three or more of the main phase grains 4, and as a result of the analysis, it was confirmed that the main phase number ratio was 50% or more and the main phase area ratio was 85% or more.

Figure 2A:
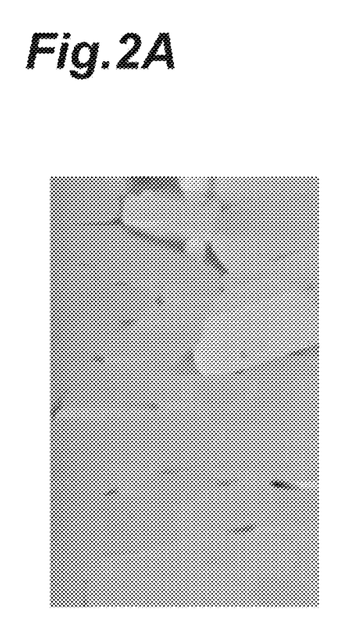
FIG. 2A to FIG. 2C are TEM images of a cross section including the direction of the easy magnetization axis of the ferrite sintered magnets obtained in the Examples and Comparative Examples, with FIGS. 2A to 2C showing a cross section of the ferrite sintered magnets of Example 4, Example 2 and Comparative Example 1 respectively.
Figure 2B:
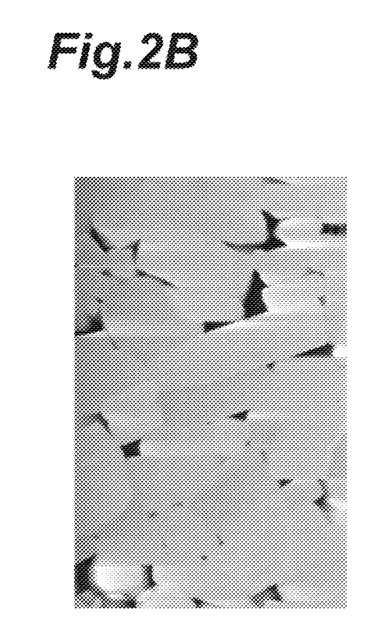
Figure 2C:
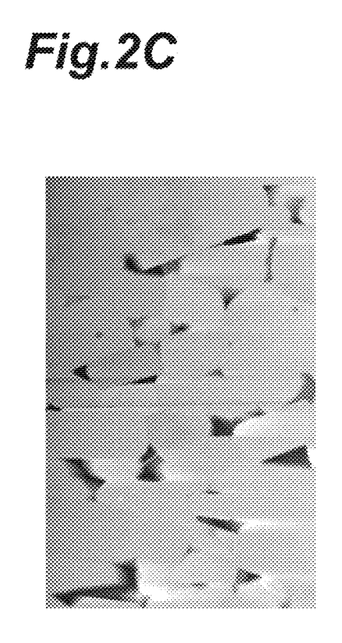

Moreover, FIGS. 2A to 2C show side by side TEM images of the cross section including the direction of the easy magnetization axis of the ferrite sintered magnets obtained in the Examples and Comparative Examples. In FIGS. 2A to 2C, FIG. 2A shows the cross section of the ferrite sintered magnet of Example 4 (same as FIG. 1B), FIG. 2B shows the cross section of the ferrite sintered magnet of Example 2, and FIG. 2C shows the cross section of the ferrite sintered magnet of Comparative Example 1. The fact that the main phase grains become denser in the order of FIG. 2C, FIG. 2B and FIG. 2A when looking at FIGS. 2A to 2C can be confirmed, and the main phase number ratio and the main phase area ratio both increase.

As is clear from Table 1, it has been confirmed that the ferrite sintered magnets of the Examples in which the main phase number ratio is 50% or more have overall high magnetic properties since they have a high Br+HcJ/10 value and have excellent Br and HcJ in good balance.

As is clear from Table 1, it has been confirmed that the ferrite sintered magnets of the Examples in which the main phase area ratio is 85% or more have overall high magnetic properties since they have a high Br+HcJ/10 value and have excellent Br and HcJ in good balance.

REFERENCE SIGNS LIST

1 . . . two-grain boundaries, 2 . . . multi-grain boundaries, 4 . . . main phase grain, 10 . . . ferrite sintered magnet

What is claimed is:

1. A ferrite sintered magnet comprising;
main phase grains containing a ferrite having a hexagonal structure;
two-grain boundaries formed between two of the main phase grains; and
multi-grain boundaries surrounded by three or more of the main phase grains,
wherein the ferrite sintered magnet comprises Ca, R, Sr, Fe and Co;

TABLE 1

| | Al Content in terms of $Al_2O_3$ (mass %) | B Content in terms of $H_3BO_3$ (mass %) | Firing step conditions | | | | | | | Main phase number ratio (%) | Main phase area ratio (area %) |
|---|---|---|---|---|---|---|---|---|---|---|---|
| | | | Temperature rising rate (° C./min) | Retention temperature (° C.) | Retention time (h) | Temperature dropping rate (° C./min) | Br (mT) | HcJ (kA/m) | Br + HcJ/10 | | |
| Example 1 | 0.05 | 0.16 | 1.0 | 1205 | 1 | 10.0 | 465 | 404 | 506 | 53.04 | 88.72 |
| Example 2 | 0.05 | 0.16 | 5.0 | 1215 | 1 | 5.0 | 472 | 305 | 503 | 51.72 | 94.51 |
| Example 3 | 0.05 | 0.16 | 1.0 | 1190 | 4 | 10.0 | 466 | 402 | 507 | 53.25 | 88.06 |
| Example 4 | 0.05 | 0.16 | 0.5 | 1205 | 1 | 10.0 | 468 | 399 | 508 | 57.89 | 96.73 |
| Comparative Example 1 | — | — | 5.0 | 1220 | 1 | 5.0 | 457 | 392 | 497 | 45.28 | 84.47 | wherein R is at least one element selected from the group consisting of rare earth elements and Bi and comprises at least La; and wherein the number Nm of the main phase grains and the number Ng of the multi-grain boundaries in a cross section including a direction of the easy magnetization axis of the ferrite sintered magnet satisfy the formula (1A):

$$50\% \leq Nm/(Nm+Ng) \leq 65 \% \tag{1A}$$

2. The ferrite sintered magnet according to claim 1, further comprising Al;

wherein a content of Al is 0.03 to 0.3 mass % in terms of $Al_2O_3$.

3. The ferrite sintered magnet according to claim 1, further comprising B;

wherein a content of B is 0.037 to 0.181 mass % in terms of $H_3BO_3$.

4. The ferrite sintered magnet according to claim 2, further comprising B;

wherein a content of B is 0.037 to 0.181 mass % in terms of $H_3BO_3$.

5. A ferrite sintered magnet comprising;

main phase grains comprising a ferrite having a hexagonal structure;

two-grain boundaries formed between two of the main phase grains; and multi-grain boundaries surrounded by three or more of the main phase grains, wherein the ferrite sintered magnet comprises Ca, R, Sr, Fe and Co;

wherein R is at least one element selected from the group consisting of rare earth elements and Bi and comprises at least La; and wherein a total area Am of the main phase grains and a total area Ag of the multi-grain boundaries in a cross section including a direction of the easy magnetization axis of the ferrite sintered magnet satisfy the formula (1B):

$$85\% \leq Am/(Am+Ag) \leq 98\% \tag{1B}$$

6. The ferrite sintered magnet according to claim 5, further comprising Al;

wherein a content of Al is 0.03 to 0.3 mass % in terms of $Al_2O_3$.

7. The ferrite sintered magnet according to claim 5, further comprising B;

wherein a content of B is 0.037 to 0.181 mass % in terms of $H_3BO_3$.

8. The ferrite sintered magnet according to claim 6, further comprising B;

wherein a content of B is 0.037 to 0.181 mass % in terms of $H_3BO_3$.

* * * * *